US012798606B2

(12) United States Patent
Vozar et al.

(10) Patent No.: US 12,798,606 B2
(45) Date of Patent: Nov. 17, 2026

(54) PLANNING TRAJECTORIES FOR CONTROLLING AUTONOMOUS VEHICLES

(71) Applicant: Waymo LLC, Mountain View, CA (US)

(72) Inventors: Steven Vozar, Saline, MI (US); Ioan-Alexandru Sucan, East Palo Alto, CA (US); Jory Denny, Sunnyvale, CA (US); Jens-Steffen Ralf Gutmann, Cupertino, CA (US); Ryan Luna, Sunnyvale, CA (US); Jonathan Daudelin, Ann Arbor, MI (US); Tian Jin, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 695 days.

(21) Appl. No.: 17/862,658

(22) Filed: Jul. 12, 2022

(65) Prior Publication Data

US 2024/0017738 A1 Jan. 18, 2024

(51) Int. Cl.
*B60W 60/00* (2020.01)
*G01C 21/34* (2006.01)

(52) U.S. Cl.
CPC ....... *B60W 60/001* (2020.02); *G01C 21/3453* (2013.01); *B60W 2520/06* (2013.01); *B60W 2520/10* (2013.01); *B60W 2520/105* (2013.01)

(58) Field of Classification Search
CPC ......... B60W 60/00186; B60W 60/001; B60W 60/0011; B60W 2520/105; B60W 2520/06; B60W 2556/50; B60W 2520/10; G01C 21/3453; B60Y 2302/05
See application file for complete search history.

(56) References Cited

U.S. PATENT DOCUMENTS 11,584,392 B2 * 2/2023 Smith ................ G01C 21/3691
2017/0199523 A1 * 7/2017 Barton-Sweeney ......................... G05D 1/0274
2017/0259819 A1 * 9/2017 Takeda ............ B60W 30/18163
2018/0148051 A1 * 5/2018 Lujan .............. B60W 30/18154
(Continued)

FOREIGN PATENT DOCUMENTS

WO 2021173137 A1 9/2021
WO 2021183137 A1 9/2021

OTHER PUBLICATIONS

The Extended European Search Report for European Patent Application No. 23184775.7, Dec. 20, 2023, 6 Pages.
(Continued)

*Primary Examiner* — Anne Marie Antonucci
*Assistant Examiner* — Jared C Bean
(74) *Attorney, Agent, or Firm* — Botos Churchill IP Law LLP

(57) ABSTRACT

Aspects of the disclosure provide for controlling an autonomous vehicle. For example, a set of potential stopping locations may be identified based on a current location of an autonomous vehicle. A set of potential states may be identified for the autonomous vehicle. A fallback cost for each potential state of the set of potential states to reach each potential stopping location of the set of potential stopping locations may be determined. A trajectory for an autonomous vehicle may be planned based on a route to a destination and the determined fallback costs. The autonomous vehicle may be controlled according to at least a portion of the trajectory.

22 Claims, 13 Drawing Sheets

200

(56) References Cited

U.S. PATENT DOCUMENTS

| | | | | |
|---|---|---|---|---|
| 2018/0188743 | A1* | 7/2018 | Wheeler | G01C 21/30 |
| 2019/0146509 | A1* | 5/2019 | Dean | G06N 7/01<br>701/25 |
| 2019/0324466 | A1* | 10/2019 | Dean | G01C 21/3492 |
| 2020/0064851 | A1* | 2/2020 | Wilkinson | G05D 1/0238 |
| 2020/0142403 | A1* | 5/2020 | Chi | G05D 1/0223 |
| 2020/0310446 | A1* | 10/2020 | Zhu | G05D 1/0217 |
| 2020/0353949 | A1* | 11/2020 | Huang | G01C 21/3691 |
| 2021/0020045 | A1* | 1/2021 | Huang | G05D 1/692 |
| 2021/0163021 | A1* | 6/2021 | Frazzoli | B60W 50/023 |
| 2021/0197819 | A1* | 7/2021 | Okamoto | B60W 30/06 |
| 2021/0229702 | A1* | 7/2021 | Tsuji | B60W 60/0016 |
| 2021/0341915 | A1 | 11/2021 | Liu et al. | |
| 2022/0016778 | A1* | 1/2022 | Sinyavskiy | G01C 21/3453 |
| 2023/0041975 | A1* | 2/2023 | Caldwell | B60W 60/0011 |
| 2023/0391363 | A1* | 12/2023 | Yang | G01C 21/3438 |

OTHER PUBLICATIONS

The Extended European Search Report for European Patent Application No. 25168646.5, Aug. 12, 2025, 13 Pages.

* cited by examiner

100

200

200

400

200

200

200

200

400

400

1100

PLANNING TRAJECTORIES FOR CONTROLLING AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

In some instances, a planning system of an autonomous vehicle may generate a trajectory and send it to another computing system in order to control the autonomous vehicle according to that trajectory. The trajectory may include a first portion that allows the autonomous vehicle to proceed towards its end goal or destination, and thereafter, the trajectory may include a fallback portion. This fallback portion may include instructions for the autonomous vehicle to safely pull over, stop, etc. such that if a new trajectory is not received in time, the autonomous vehicle can safely pull over. The policy planning features described herein may enable the fallback portion of a trajectory to influence the nominal portion of the trajectory, thus improving the likelihood of the fallback portion causing the autonomous vehicle to stop in the best possible circumstances.

In some instances, a planning system of an autonomous vehicle may plan two trajectories and combine portions of them together in order to control the autonomous vehicle towards a destination. For example, the planning system may plan a nominal trajectory or a long term (e.g., 10, 12, 16 second or more or less) plan to maneuver the autonomous vehicle towards its destination. However, rather than publishing this trajectory, the planning system may also generate a second or fallback trajectory to be published to other systems of the autonomous vehicle. When planning a fallback trajectory, the planning system may extract or match an initial section of the nominal trajectory, such as 400 milliseconds or more or less, and use this as the first portion of the fallback trajectory.

A second or fallback portion of the fallback trajectory may then be determined independently of or based on the nominal trajectory. The fallback trajectory may then be published to other systems of the autonomous vehicle and used to control the autonomous vehicle. In this regard, the autonomous vehicle's computing devices are always following a fallback trajectory, though under normal operation do not execute the entire fallback trajectory. Under normal operation, because the trajectory used by the autonomous vehicle's computing devices is updated before the autonomous vehicle reaches the fallback portion (e.g., the 400 milliseconds section where the fallback trajectory diverges from the nominal trajectory), the autonomous vehicle only follows the nominal trajectory. However, if a new trajectory is not published by the time the fallback portion is reached or some point before this, the autonomous vehicle's computing devices may simply continue to follow the fallback portion of the fallback trajectory and bring the autonomous vehicle to a stop.

The fallback portion may be planned in different ways. For example, in some approaches, the fallback portion may simply follow the geometry of the nominal trajectory, but change the speed profile of the nominal trajectory in order to bring the autonomous vehicle to a stop. In this regard, the fallback portion may be influenced by the nominal trajectory rather than the other way around.

BRIEF SUMMARY

Aspects of the disclosure provides a method for controlling an autonomous vehicle. The method include identifying, by one or more processors, a set of potential stopping locations based on a current location of an autonomous vehicle; identifying, by the one or more processors, a set of potential states for the autonomous vehicle; determining, by the one or more processors, a fallback cost for each potential state of the set of potential states to reach each potential stopping location of the set of potential stopping locations; planning, by the one or more processors, a trajectory for an autonomous vehicle based on a route to a destination and the determined fallback costs; and controlling, by the one or more processors, the autonomous vehicle according to at least a portion of the trajectory.

In one example, the set of potential states is identified based on the current location and a planning horizon for the trajectory. In this example, the planning horizon is measured in time. In another example, the determined fallback costs are determined using a backward induction approach. In this example, the backward induction approach provides a point in time for each potential state of the set of potential states. In another example, each potential state of the set of potential states includes a location. In this example, each potential state of the set of potential states further includes a combination of characteristics. In another example, a first potential state of the set of potential states includes a first location and a first future point in time, and a second potential state of the set of potential states includes the first location and a second future point in time different from the first future point in time. In another example, a first potential state of the set of potential states includes a first location and a first plurality of characteristics, and a second potential state of the set of potential states includes the first location and a second plurality of characteristics different from the first plurality of characteristics. In this example, the first plurality of characteristics includes a speed of the autonomous vehicle different from a speed of the autonomous vehicle of the second plurality of characteristics. In addition, or alternatively, the first plurality of characteristics includes an acceleration or deceleration of the autonomous vehicle different from acceleration or deceleration of the autonomous vehicle of the second plurality of characteristics. In addition, or alternatively, the first plurality of characteristics includes a rate of change of acceleration or deceleration of the autonomous vehicle different from a rate of change of acceleration or deceleration of the autonomous vehicle for the second plurality of characteristics. In addition, or alternatively, the first plurality of characteristics includes a heading of the autonomous vehicle different from a heading of the autonomous vehicle of the second plurality of characteristics. In addition, or alternatively, first plurality of characteristics includes an orientation of the autonomous vehicle different from an orientation of the autonomous vehicle of the second plurality of characteristics. In another example, determining the determined fallback costs results in a cost map, and the method further comprises planning a fallback trajectory based on at least the cost map.

Another aspect of the disclosure provides a system for controlling an autonomous vehicle. The system includes one or more processors configured to identify a set of potential stopping locations based on a current location of an autonomous vehicle; identify a set of potential states for the autonomous vehicle; determine a fallback cost for each potential state of the set of potential states to reach each potential stopping location of the set of potential stopping locations; plan a trajectory for an autonomous vehicle based on a route to a destination and the determined fallback costs; and control the autonomous vehicle according to at least a portion of the trajectory.

In one example, the set of potential states is identified based on the current location and a planning horizon for the trajectory. In another example, the determined fallback costs are determined using a backward induction approach. In this example, the backward induction approach provides a point in time for each potential state of the set of potential states. In another example, each potential state of the set of potential states includes a location.

DETAILED DESCRIPTION

Overview

Figure 1:
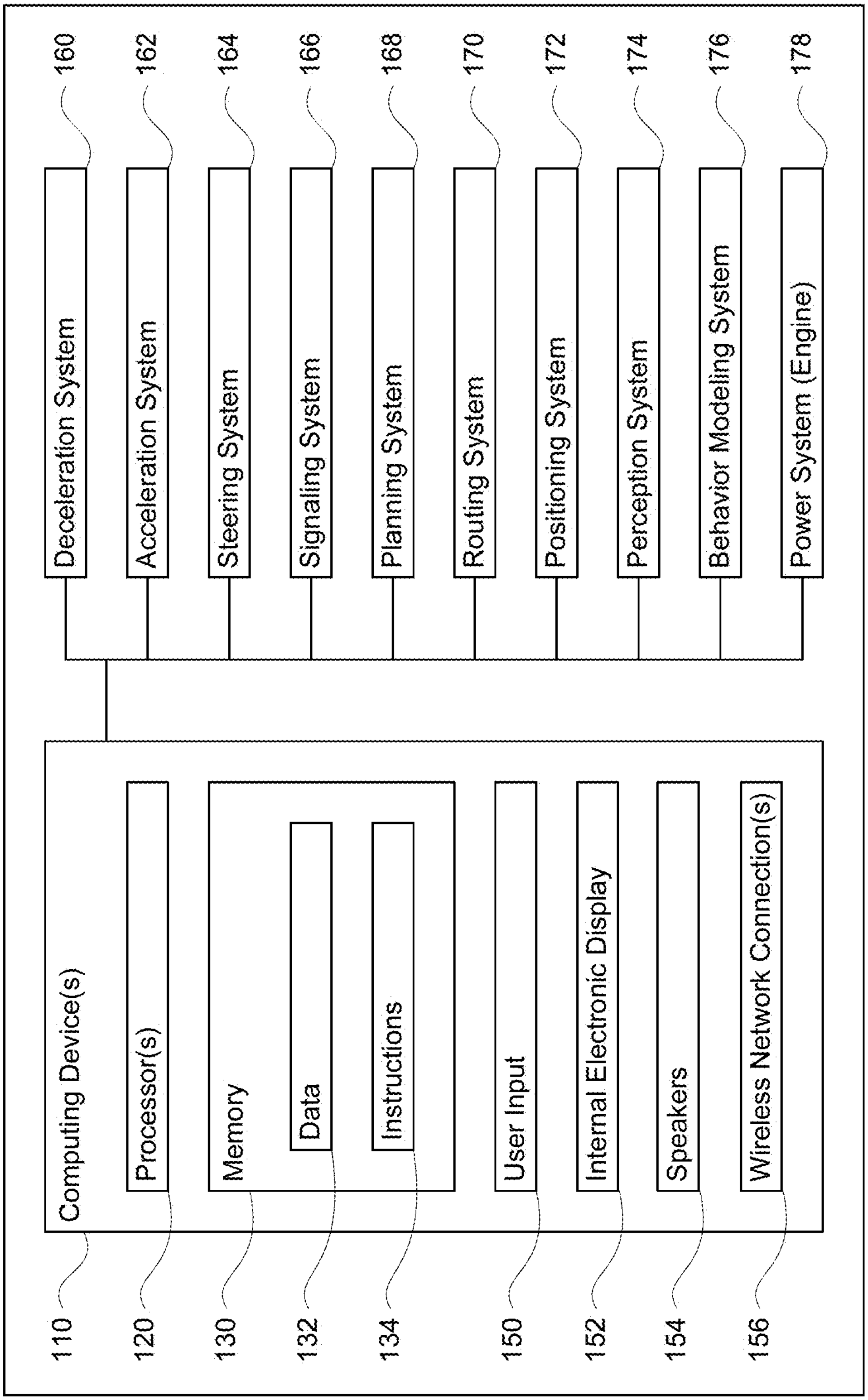
FIG. 1 is a functional diagram of an example vehicle in accordance with an exemplary embodiment.

The technology relates to planning trajectories for controlling autonomous vehicles. For instance, a planning system of an autonomous vehicle may generate a trajectory and send it to another computing system in order to control the autonomous vehicle according to that trajectory. The trajectory may include a first portion that allows the autonomous vehicle to proceed towards its end goal or destination, and thereafter, the trajectory may include a fallback portion. This fallback portion may include instructions for the autonomous vehicle to safely pull over, stop, etc. such that if a new trajectory is not received in time, the autonomous vehicle can safely pull over. The policy planning features described herein may enable the nominal portion of the trajectory to take into account potential fallback considerations, thus improving the likelihood of the fallback portion causing the autonomous vehicle to stop in the best possible circumstances.

For instance, as described above, in some of today's autonomous vehicles, a planning system of an autonomous vehicle may plan two trajectories; a nominal trajectory and a fallback trajectory. For example, the planning system may plan a nominal trajectory or a long term (e.g., 10, 12, 6 second or more or less) plan to maneuver the autonomous vehicle towards its destination. However, rather than publishing this trajectory, the planning system may also generate a second or fallback trajectory. When planning a fallback trajectory, the planning system may extract or match an initial section of the nominal trajectory, such as 400 milliseconds or more or less, and use this as the first portion of the fallback trajectory.

A second or fallback portion of the fallback trajectory may then be determined independently of or based on the nominal trajectory. The fallback trajectory may then be published to other systems of the autonomous vehicle and used to control the autonomous vehicle. In this regard, the autonomous vehicle's computing devices are always following a fallback trajectory, though under normal operation do not execute the entire fallback trajectory. Under normal operation, because the trajectory used by the autonomous vehicle's computing devices is updated before the autonomous vehicle reaches the fallback portion (e.g., the 400 milliseconds section where the fallback trajectory diverges from the nominal trajectory), the autonomous vehicle only follows the nominal trajectory. However, if a new trajectory is not published by the time the fallback portion is reached or some point before this, the autonomous vehicle's computing devices may simply continue to follow the fallback portion of the fallback trajectory and bring the autonomous vehicle to a stop.

The fallback portion may be planned in different ways. For example, in some approaches, the fallback portion may simply follow the geometry of the nominal trajectory, but change the speed profile of the nominal trajectory in order to bring the autonomous vehicle to a stop. In this regard, the fallback portion may be influenced by the nominal trajectory rather than the other way around. To address this, the fallback trajectory may be planned independently of the nominal trajectory.

In order to plan a nominal trajectory, the autonomous vehicle's computing devices may first identify a set of potential stopping locations. These potential stopping locations may be located within a predetermined distance from the autonomous vehicle (in time or space). For example, if an autonomous vehicle's trajectory planning involves generating trajectories that extend a period of 10 seconds into the future, the autonomous vehicle's computing devices may identify potential stopping locations that the autonomous vehicle can potentially reach within the next 10 seconds based on one or more of the autonomous vehicle's current speed, achievable speed within that period, speed limit of the road on which the autonomous vehicle is driving, etc. Potential stopping locations may include simply stopping at different locations (e.g., nodes in a roadgraph of map information) in a current lane, adjacent lane, a shoulder area, etc. Such potential stopping locations may be identified based on a number of factors including those that are within a visible field of view, road geometry, size of the autonomous vehicle, capabilities of the autonomous vehicle (e.g., maneuverability of the autonomous vehicle), and so on.

For each identified stopping location of the set of potential stopping locations, the planning system may determine a cost map. This cost map may include assessing fallback costs for a plurality of different potential states of the autonomous vehicle. For instance, a set of potential states may be identified. For example, a fallback cost may correspond to the cost of reaching a potential stopping location from the potential state. The higher the fallback cost, the less desirable that potential state.

The potential states may include both a plurality of potential characteristics of the autonomous vehicle as well as locations that the autonomous vehicle can potentially reach within a planning horizon for the nominal trajectory based on one or more of the autonomous vehicle's current speed, achievable speed within that period, speed limit of the road on which the autonomous vehicle is driving, etc. The plurality of characteristics for each potential state may include a combination of different characteristics, such as heading, orientation, speed, acceleration or deceleration, rate of change of acceleration or deceleration, time, and so on.

Starting at the potential stopping location, the planning system may use a backward induction approach to plan a trajectory from each of the potential stopping locations to each of the potential states of the set of potential states. The backward induction may start from each of the potential stopping locations and use the map information in order to compute the fallback cost of reaching the potential stopping location from any of the potential states of the set of potential states. The result is a cost map that the planning system can greedily follow to get a fallback trajectory that leads to the best of the potential stopping locations from any of the potential states. In this regard, the cost map may encode a minimum fallback cost that can be achieved to reach a stopping location starting from each potential state.

The cost map may then be input into the planning system in order to plan or generate nominal trajectory. In the instances where a plurality of nominal trajectories is generated, the overall costs of all nominal trajectories may then be used to select a nominal trajectory using the costs of the cost map. A final trajectory may then be generated by using a first portion of the selected nominal trajectory and a second portion of a fallback trajectory generated based on the first portion of the selected nominal trajectory. The final trajectory may then be published to other systems of the autonomous vehicle and used to control the autonomous vehicle.

The features described herein may enable an autonomous vehicle to plan a nominal trajectory which is influenced by the costs of potential fallbacks. This, in turn, may enable the autonomous vehicle to improve its overall performance in the event of failure which requires the autonomous vehicle to stop and/or pull over.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving, operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g., garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as other client computing devices and server computing devices. The wireless network connections may include short range communication protocols such as Bluetooth. Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), parking spots, vegetation, or other such objects and information.

Figure 2A:
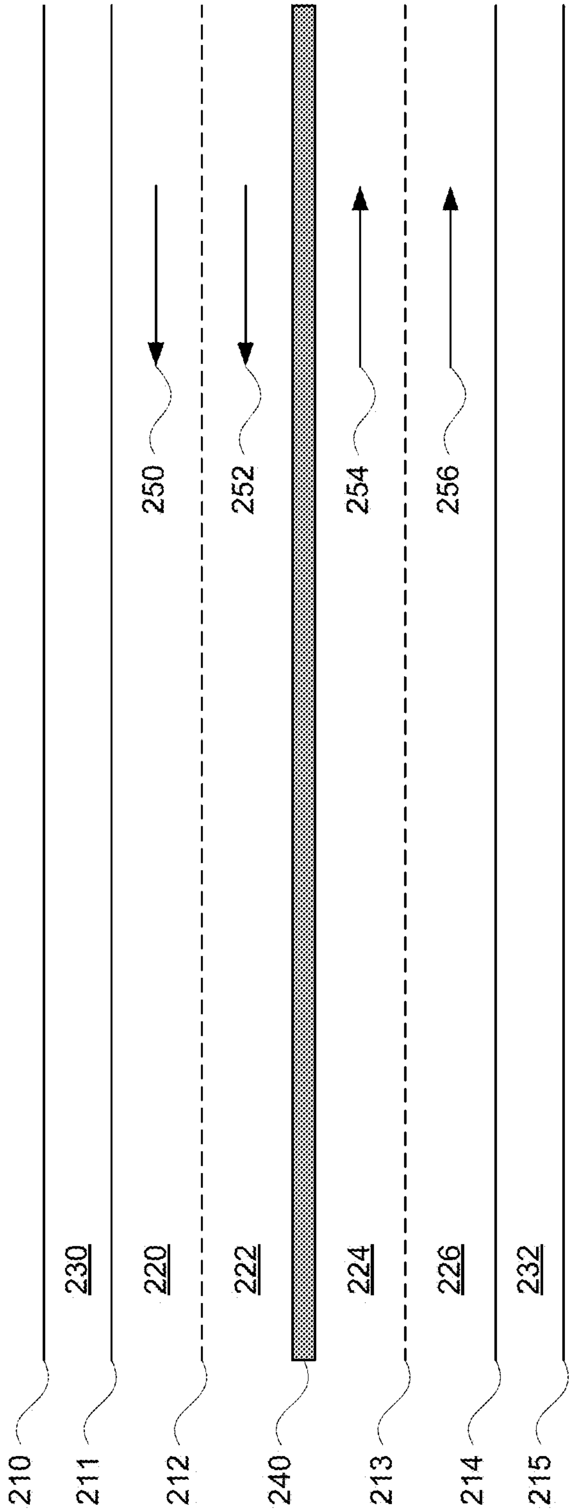
FIGS. 2A-2B is an example of map information in accordance with aspects of the disclosure.
Figure 2B:
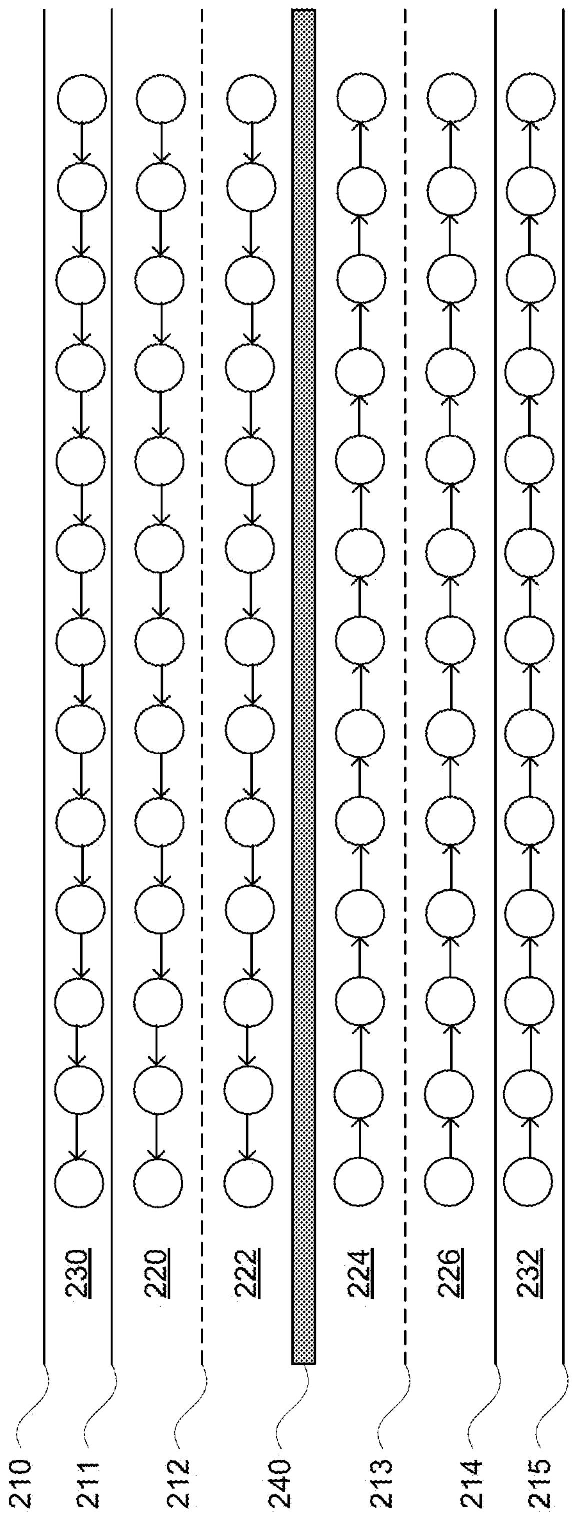

FIGS. 2A and 2B is an example of map information 200 for a small section of roadway. FIG. 2A depicts a portion of the map information 200 that includes information identifying the shape, location, and other characteristics of lane markers or lane lines 210, 211, 212, 213, 214, 215 which define the boundaries of lanes 220, 222, 224, 226, as well as shoulder areas 230, 232. In this regard, some areas which may not necessarily be lanes (for example shoulder areas) may be identified as drivable areas (for example, lanes). In this example, a median 240 divides lanes 220, 222 from lanes 224,226. Although not shown in this example, the map information also includes other features such as intersection, traffic control devices, crosswalk areas, sidewalks, and so on. In addition to the aforementioned features and information, the map information may also include information that identifies the direction of traffic for each lane (represented by arrows 250, 252, 254, 256 in FIG. 2A) as well as information that allows the computing devices 110 to determine whether the vehicle has the right of way to complete a particular maneuver (for example, complete a turn or cross a lane of traffic or intersection).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

FIG. 2B includes a few example representations (not all) of the aforementioned nodes (represented by open circles) corresponding to a portion of the map information 200. These nodes, when linked together via edges (represented by arrows between the nodes), may form paths within lanes that the autonomous vehicle can follow to correctly position itself within a lane and/or through an intersection. These paths may be formed by following edges between nodes in the aforementioned roadgraph. As an example, an edge may correspond to a segment of drivable road surface between two nodes in the map information. Thus, each mapped drivable road surface (e.g., lanes, shoulder areas, parking lots, etc.) may be associated with nodes and edges in the roadgraph. Moreover, the nodes and edges are depicted herein as being relatively large for ease of representation. However, each node may actually correspond to a point (e.g., coordinates such as latitude, longitude, altitude), and the edges in the roadgraph may range from a few centimeters to a few meters as noted above. Each of these edges has an overlapping starting and/or end node with adjacent edges depending upon the direction of the lane to which the edge corresponds.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. For example, each individual edge in the roadgraph may be associated with a cost. These costs may be summed together with or without additional costs (e.g., additional costs for maneuvers or convenience, etc.) in order to determine the overall cost of a particular route. When multiple routes are generated, the route with the lowest overall cost may be selected by the routing system and published to the various other systems of the autonomous vehicle. For example, between a route with a large number of intersections with traffic controls (such as stop signs or traffic signal lights) versus one with no or very few traffic controls, the latter route may have a lower cost (e.g., because it is faster) and therefore be preferable. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
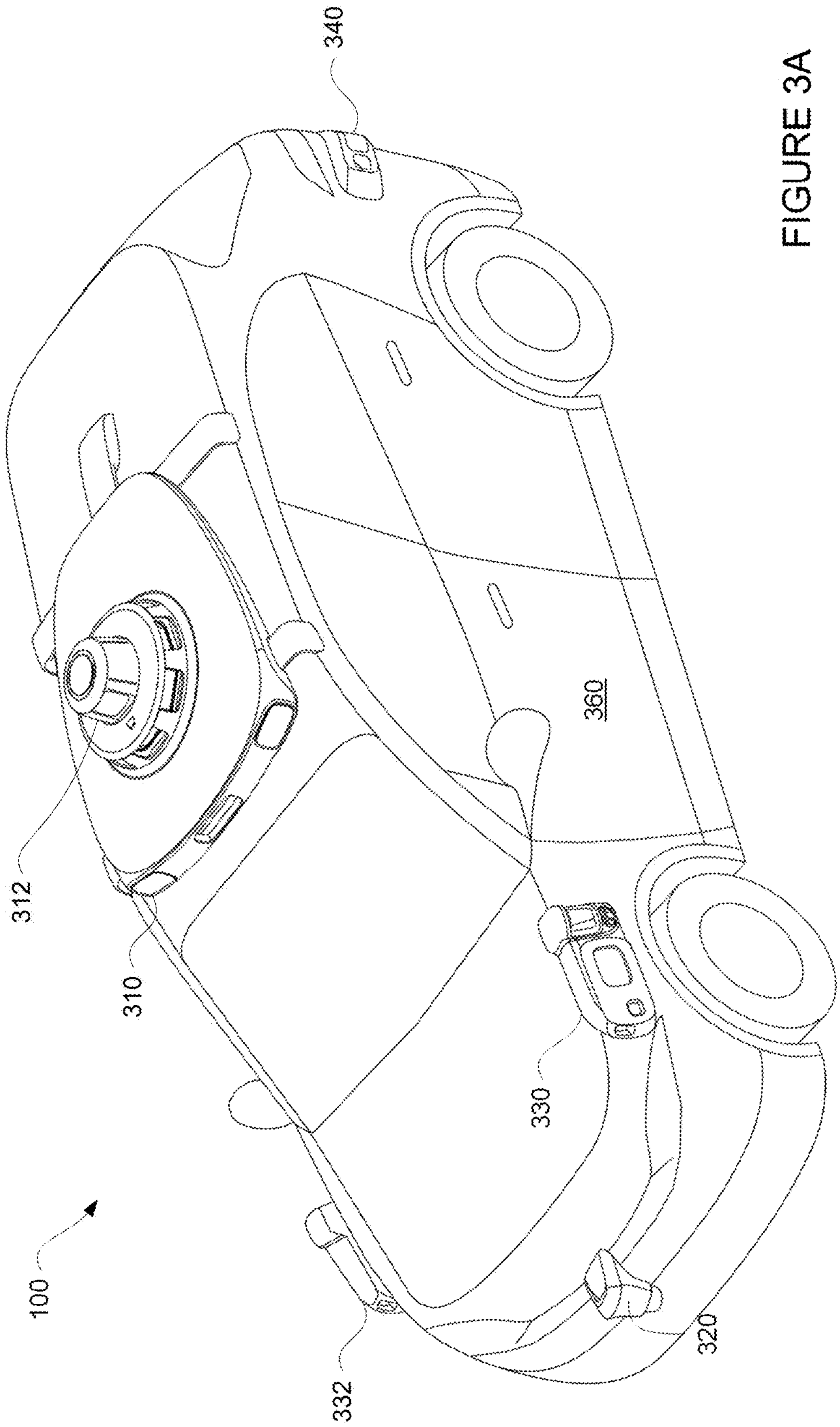
FIGS. 3A-3B are example external views of a vehicle in accordance with aspects of the disclosure.
Figure 3B:
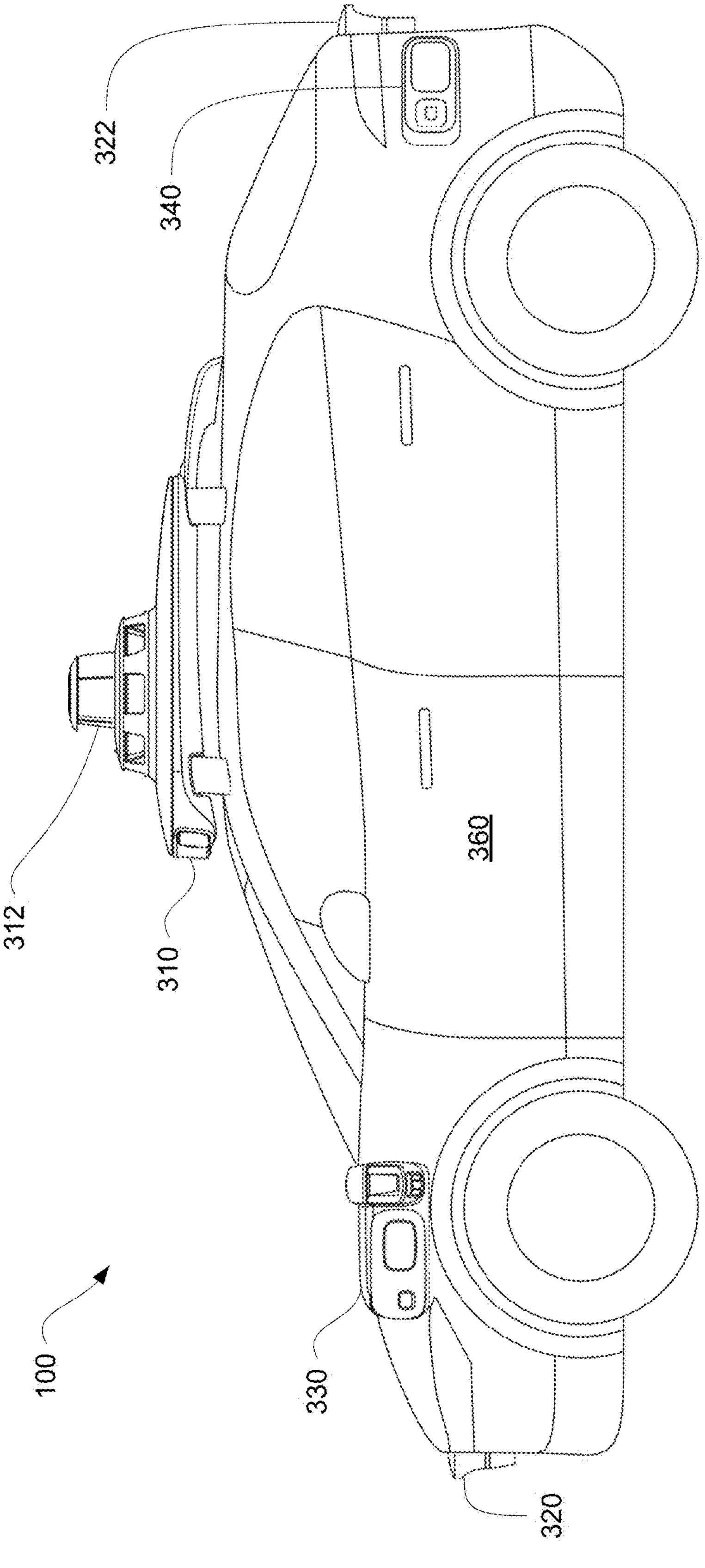

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170.

A similar process as described above with regard to assessing costs of routes may be used for computing costs of and selecting trajectories by the planning system 168. In other words, during a planning iteration, the planning system may generate a plurality of potential trajectories. The costs of each edge of a potential trajectory may be summed together with or without additional costs (e.g., additional costs for maneuvers or convenience, getting too close to other objects, etc.) in order to determine the overall cost of the potential trajectory. The lowest cost potential trajectory may then be selected by the planning system as the next trajectory for the autonomous vehicle to follow.

Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device lit) and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
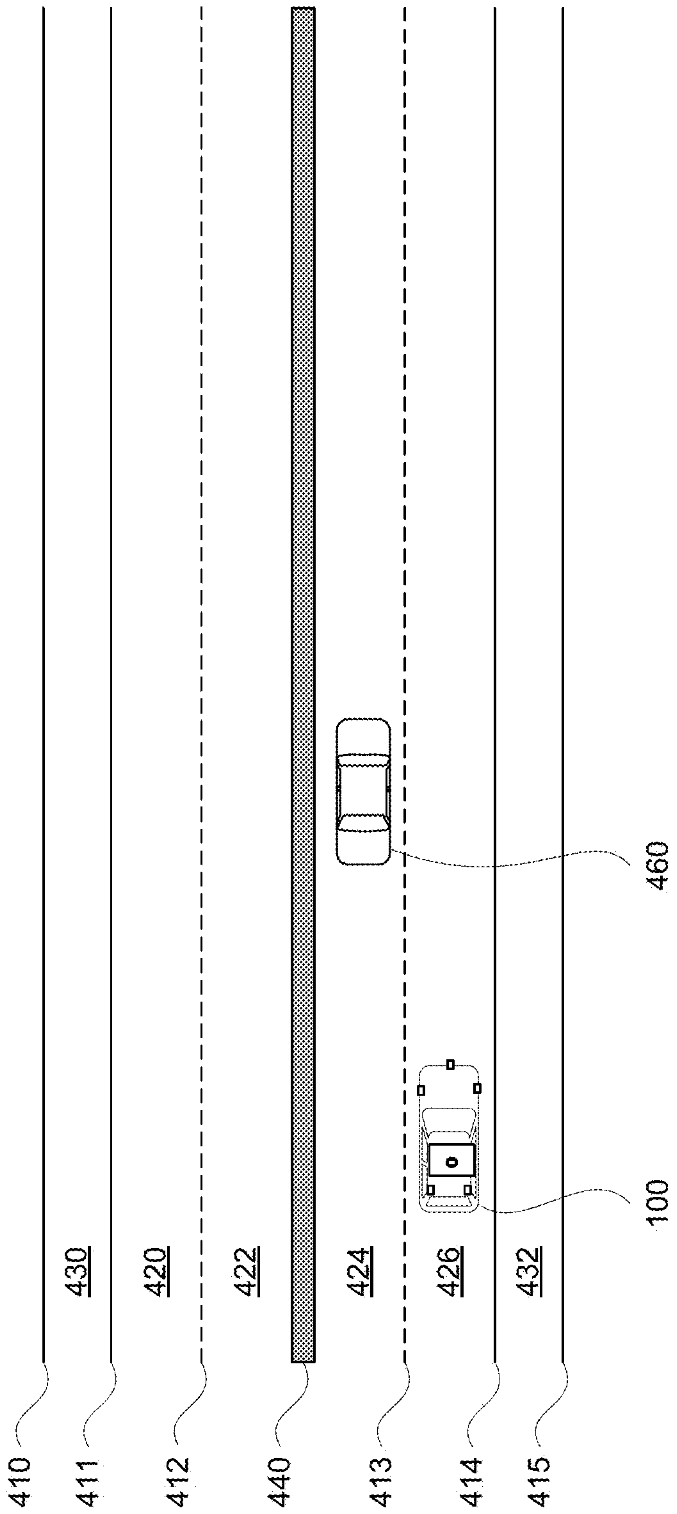
FIG. 4 is an example representation of a geographic area and vehicles in accordance with aspects of the disclosure.
Figure 11:
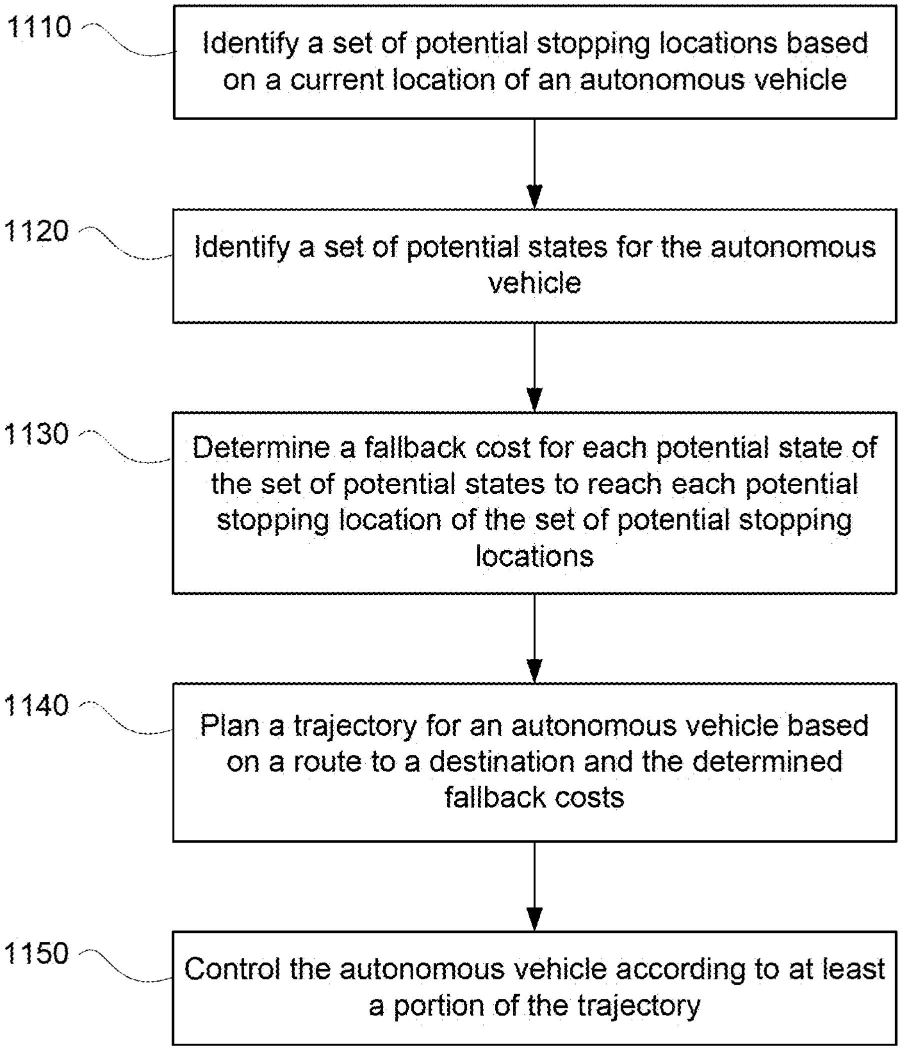
FIG. 11 is an example flow diagram in accordance with aspects of the disclosure.

FIG. 11 provides an example flow diagram 1100 for controlling an autonomous vehicle, which may be performed by one or more processors, such as the one or more processors of the computing devices 110 and/or the planning system 168. As shown in block 1110, based on a current location of an autonomous vehicle, a set of potential stopping location is identified. FIG. 4 represents a geographic area 400 corresponding to the area of the map information 200. In this example, the shape, location, and other characteristics of lane markers or lane lines 410, 411, 412, 413, 414, 415 correspond to the shape, location, and other characteristics of lane markers or lane lines 210, 211, 212, 213, 214, 215. In this regard, the shape, location, and other characteristics of lanes 420, 422, 424, 426, shoulder areas 430, 432, and median 440 correspond to the shape, location, and other characteristics of lanes 220, 222, 224, 226, shoulder areas 230, 232, and median 240, respectively. In this example, autonomous vehicle 100 is driving in lane 426 (again, corresponding to lane 226), and another vehicle 460 is parked in the shoulder area 432.

In order to plan or generate a nominal trajectory, the autonomous vehicle's computing devices may first identify a set of potential stopping locations. These potential stopping locations may be located within a predetermined distance from the autonomous vehicle (in time or space). For example, if an autonomous vehicle's trajectory planning involves generating trajectories that extend a period of 10 seconds into the future, the autonomous vehicle's computing devices may identify potential stopping locations that the autonomous vehicle can potentially reach within the next 10 seconds based on one or more of the autonomous vehicle's current speed, achievable speed within that period, speed limit of the road on which the autonomous vehicle is driving, etc. Potential stopping locations may include simply stopping at different locations (e.g., nodes in a roadgraph of map information) in a current lane, adjacent lane, a shoulder area, etc. Such potential stopping locations may be identified based on a number of factors including those that are within a visible field of view, road geometry, size of the autonomous vehicle, characteristics of the autonomous vehicle (e.g., maneuverability of the autonomous vehicle), and so on.

Figure 5:
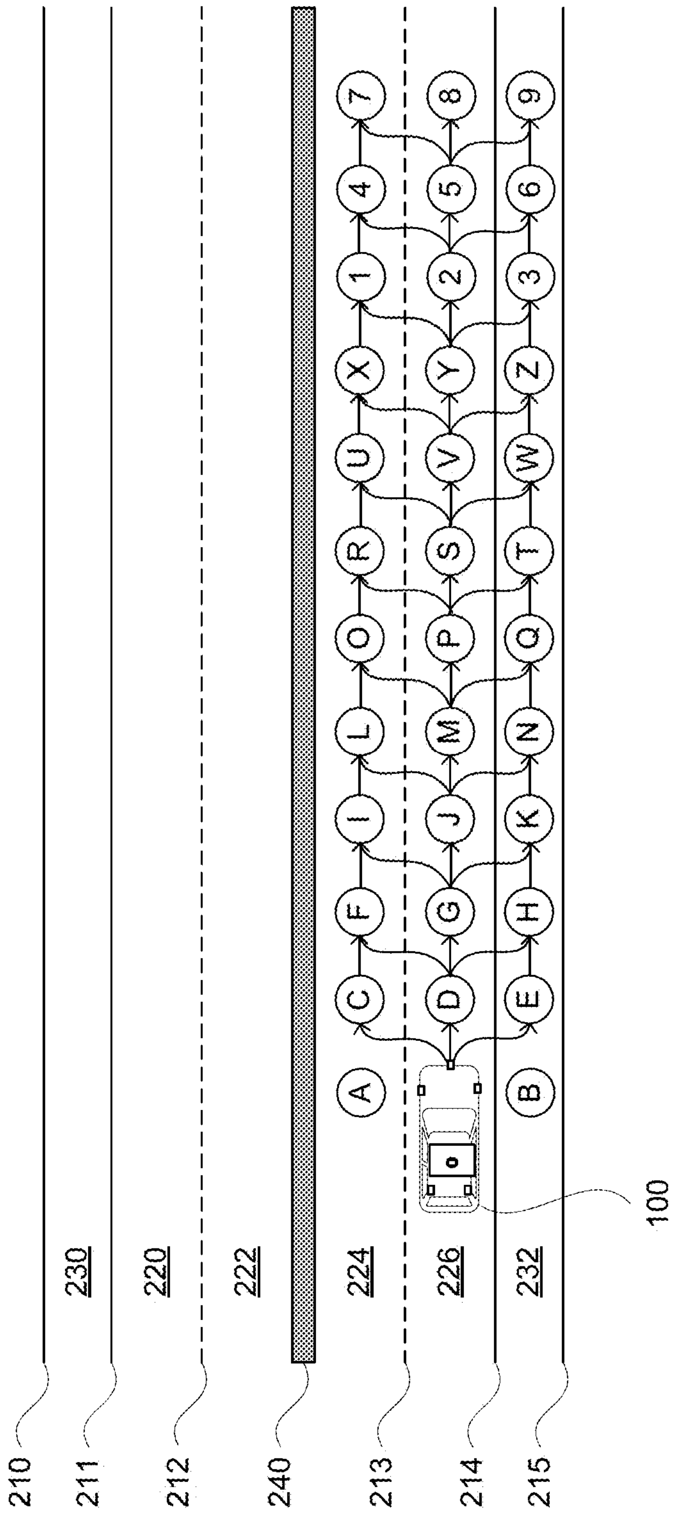
FIG. 5 is an example of map information and an autonomous vehicle in accordance with aspects of the disclosure.

For example, turning to FIG. 5, the autonomous vehicle's location in FIG. 4 is depicted with respect to the map information 200. In this example, a set of potential stopping locations may include all of the nodes in front of the autonomous vehicle and within a certain distance in time (e.g., 10 seconds). In this example, the nodes of the set of potential stopping locations A-Z and 1-9 are depicted and all other nodes (of the map information) are not depicted.

In some instances, the set of potential stopping locations may be identified, for instance, by scoring the potential stopping location. As with typical scoring approaches, the scoring may be based on road geometry, how wide the stopping location is (e.g., if a shoulder or parking spot), probability that the stopping location will block or inconvenience other road users (e.g., if there is construction ahead which blocks a left lane, stopping to the left may reduce the likelihood of blocking other road users), whether the autonomous vehicle's perception system is able to perceive the stopping location, whether the stopping location is across 2 lanes, within a lane, within a shoulder, within an intersection, at a railroad crossing, high-speed lanes, and so on. One or more of the highest-scoring stopping locations may be included in the set of potential stopping locations.

In this regard, the set of potential stopping locations may include all of the identified potential stopping locations or simply one or more of the highest-scoring stopping locations may be identified. By using all of the potential stopping locations, this may enable the autonomous vehicle to avoid potential states that may result in less desirable stopping locations as discussed further below.

Returning to FIG. 11, at block 1120, a set of potential states may be identified. Each of the potential states may include a combination of a location and a plurality of characteristics. Each location may correspond to a node of the roadgraph that the autonomous vehicle can potentially reach within the planning horizon (e.g., the next 10 seconds) based on one or more of the autonomous vehicle's current speed, achievable speed within that period, speed limit of the road on which the autonomous vehicle is driving, etc. Alternatively, the planning system may simply select the X number of reachable nodes in the roadgraph given the current direction of travel of the autonomous vehicle 100. As noted above, each potential state may also include a plurality of characteristics. The plurality of characteristics for each potential state may include a combination of different characteristics, such as heading, orientation, speed, acceleration or deceleration, rate of change of acceleration or deceleration, and so on. The exact combinations used may be predefined (e.g., manually or by using a machine learned process to select the most likely potential states at any given node of the roadgraph) and depend upon the desires of the transportation service, the current driving conditions for the autonomous vehicle (e.g., traffic, current speed of the autonomous vehicle, etc.), as well as the capabilities of the autonomous vehicle.

A given location or node may be assigned a plurality of different combinations of characteristics, such that a single node may be used in multiple states with different combinations of characteristics. As an example, each node may be assigned to up to or even more than six potential states for a plurality of different times. For instance, the plurality of potential states may include a first potential state including a first node with a first combination of characteristics, the first node with a second combination of characteristics, a second node with the first combination of characteristics, the second node with the second plurality of characteristics, a third node with the second combination of characteristics, and so on. In this regard, each of nodes A-Z and 1-3 may be assigned one or more combinations of characteristics.

Returning to FIG. 11, at block 1130, a fallback cost for each potential state of the set of potential states to reach each potential stopping location of the set of potential stopping locations may be determined. Starting at the potential stopping location, the planning system may use a backward induction approach to plan a trajectory from each of the potential stopping locations to each of the potential states of the set of potential states. The backward induction may start from each of the potential stopping locations and use the map information in order to compute the cost (or fallback cost) of reaching the potential stopping location from any of the potential states of the set of potential states. In this regard, as noted above the map information may include costs for transitioning between nodes, making certain maneuvers (e.g., lane changes), for each potential stopping location, and so on.

In addition, this backward induction may also be used to determine a point in time for each of the potential states or rather at what time the autonomous vehicle can be at a particular node with a particular plurality of characteristics in order to reach a particular potential stopping location with the lowest cost. This point in time may be a future point in time, and may be based on the characteristics of the potential state and capabilities of the autonomous vehicle. In this regard, in addition to the fallback costs, the cost map may include a point in time for each potential state.

In some instances, the backward induction may also be used to determine other characteristics of the autonomous vehicle for each potential state which may also be included in the cost map. For example, if the autonomous vehicle includes a trailer or other feature which may have a different orientation or heading than the rest of the autonomous vehicle, the backward induction may be used to infer that orientation or heading. This may be repeated if there are multiple such features (e.g., multiple trailers, a bus with articulating portions, etc.). Alternatively, such information could be included as part of the plurality of characteristics for the different potential states of the set of potential states.

As shown in FIG. 5, the edges (represented by straight arrows) and other connections representing lane changes (represented by curved arrows) between the nodes, are depicted. By connecting these nodes together, the various possible paths that the autonomous vehicle can use to reach each particular node may be identified. The costs of the edges of these paths, costs of the lane changes, as well as other costs as noted above may be summed to determine the costs of each potential stopping location. Of course, as noted above, each node in the set of potential stopping locations may have various different costs depending upon the different potential states of the set of potential states. In this regard, the costs of a path including a plurality of such transitions can be summed to determine the fallback cost of each potential state of the set of potential states or rather stopping the vehicle at the best potential fallback location from any of the set of potential states.

The result is a cost map that the planning system can greedily follow to get a fallback trajectory that leads to the best of the potential stopping locations from any of the potential states. In this regard, the cost map may encode a minimum fallback cost that can be achieved starting from each potential state. Thus, a high fallback cost for a particular potential state of the set of potential states may indicate the optimal fallback trajectory starting from that potential state is more difficult to achieve, and a low fallback cost may indicate that the optimal fallback trajectory starting from that potential state is easier to achieve (e.g., more comfortable braking, etc.).

Figure 6:
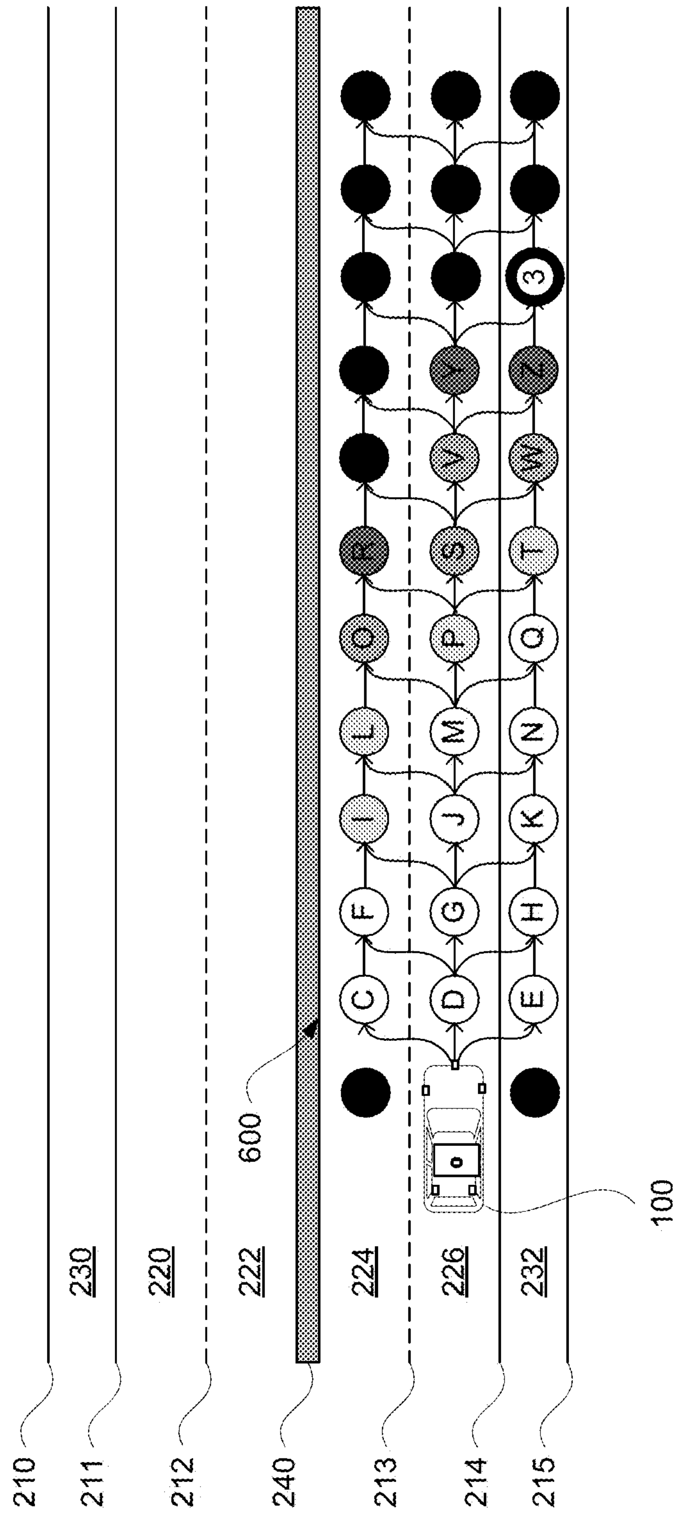
FIG. 6 is an example of map information, an autonomous vehicle, and a gradient of fallback costs in accordance with aspects of the disclosure.

As an example, FIG. 6 represents a gradient of fallback costs 600 for a plurality of potential states represented by nodes A-Z and 1-9 of the autonomous vehicle reaching a potential stopping location corresponding to the location of node 3. In addition, each potential state represented by the nodes of FIG. 6 therefore includes the same characteristics for the vehicle, for example, the same speed and heading. Thus, the gradient of fallback costs 600 may represent the cost for the autonomous vehicle 100 to reach node 3 from each of the other nodes of the gradient. In this regard, the gradient of fallback costs 600 represents only a portion of the cost map as other gradients of fallback costs would be determined for different stopping locations and characteristics of the autonomous vehicle (e.g., combinations of speed and heading). In this example, the darkest nodes represent potential states having the highest costs, and the lightest nodes representing potential states having the lowest costs.

For instance, nodes that are very close to the autonomous vehicle, such as nodes A, B may have infinitely high costs as the autonomous vehicle 100 may not be capable of reaching those nodes. Nodes that are close to the potential stopping location may also have higher costs, for example, as there may not be enough braking power given the autonomous vehicle's current speed, etc.). Similarly, nodes that are beyond or directly adjacent to the potential stopping location may have infinitely high costs as the autonomous vehicle 100 may not be capable of reaching those nodes if stopping at the potential stopping location (here, node 3). Thus, as the autonomous vehicle 100 moves closer to the node 3, the costs generally increase, and at the same time, nodes in lane 224 (which would require the autonomous vehicle to make a lane change) may have higher costs than nodes in lane 226 or shoulder area 232 (which would allow the autonomous vehicle to pull out of a driving lane). The cost map may therefore provide a simple way to find the "optimal" fallback trajectory for all stopping locations for each potential state.

Figure 7:
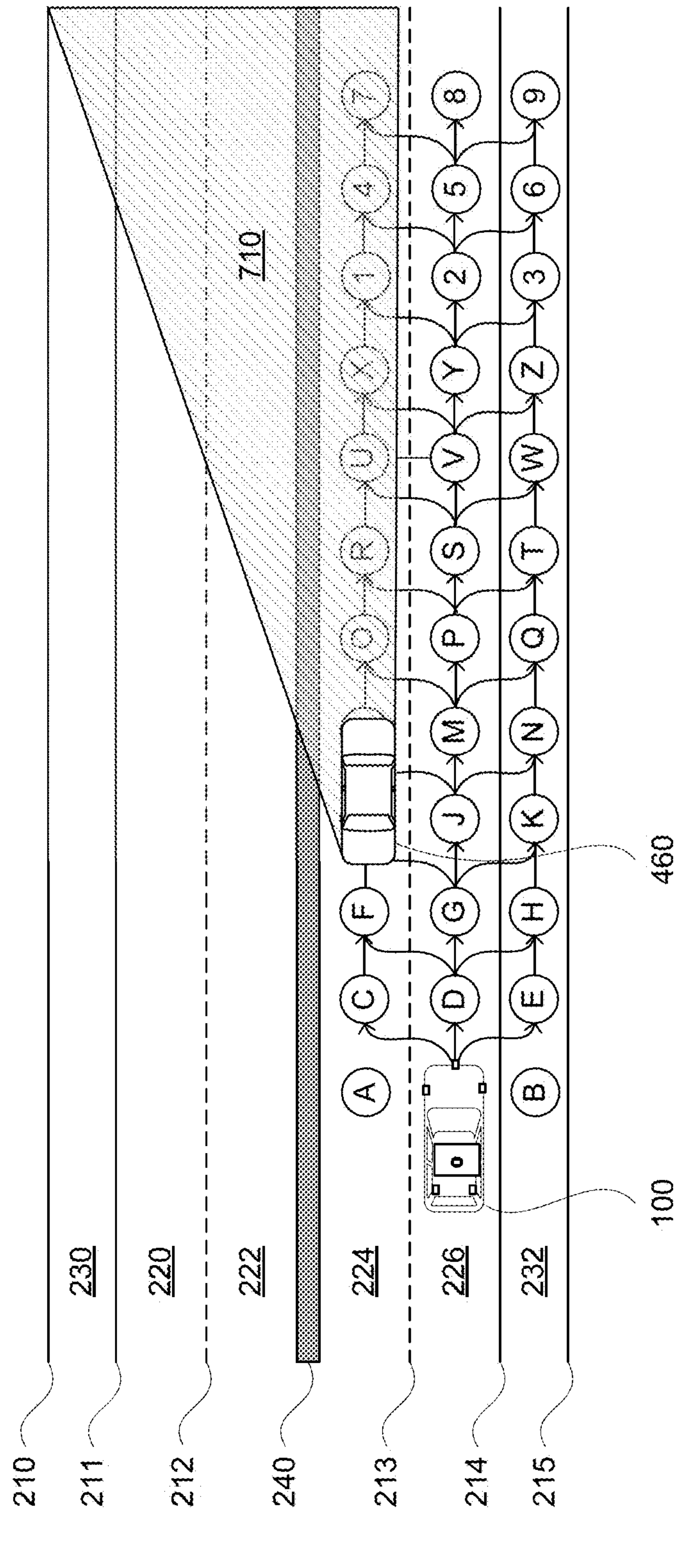
FIG. 7 is an example of map information, an autonomous vehicle, and an occluded area in accordance with aspects of the disclosure.

In some instances, as in the example of gradient of fallback costs 600, when determining these costs, the planning system may ignore information from the perception system such as the location of other objects (e.g., other road users or obstacles such as the vehicle 460) not included in the map information 200. However, in some instances, occluded areas resulting from the locations of this object. For example, an additional cost may be added to any nodes that are occluded or the costs of nodes within occluded areas may be set to infinitely high values. FIG. 7 depicts occluded area 710 resulting from the location of the vehicle 460. In this example, the occluded area includes the locations of nodes O, R, U, X, 1, 4, 7. The occluded areas may be provided to the planning system by the perception system or another occlusion system which identifies which nodes of the roadgraph are occluded based on information generated, by the perception system. As an example, the cost of stopping at an occluded node may be increased by a fixed amount or may be set to an infinitely high value so that such nodes (or potential stopping locations have infinitely high costs).

Figure 8:
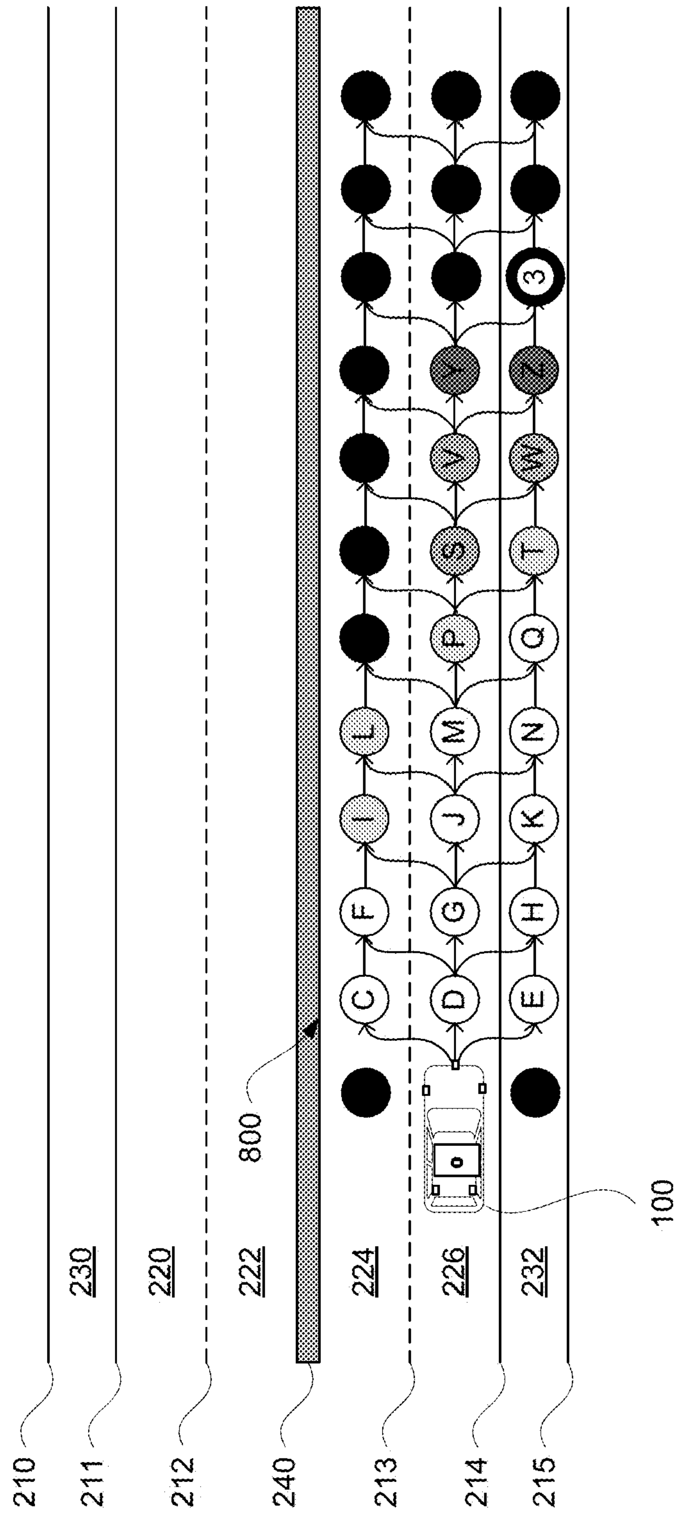
FIG. 8 is an example of map information, an autonomous vehicle, and a gradient of fallback costs in accordance with aspects of the disclosure.

FIG. 8 represents a gradient of fallback costs 800 for a plurality of potential states represented by nodes A-Z and 1-9 of the autonomous vehicle reaching a potential stopping location corresponding to the location of node 3 (as in the example of FIG. 6). In this example, the gradient of fallback costs 800 is based on the occluded area 710 resulting from the location of the vehicle 460, the costs of nodes within the occluded area 710, such as nodes O, R, U, X, 1, 4, 7, may be set to high or even infinitely high values. Comparing gradients of fallback costs 600 and 800, the costs of nodes O and R reaching the node 3 are greater in the gradient of fallback costs 800 than in the gradient of fallback costs 600. Thus, the gradients of fallback costs 600 and 800 are different. Again, like the gradient of fallback costs 600, the gradient of fallback costs 800 represents only a portion of the cost map as other gradients of fallback would be determined for different stopping locations and characteristics of the autonomous vehicle (e.g., combinations of speed and beading).

Returning to FIG. 11, at block 1140, a trajectory for an autonomous vehicle is planned based on a route to a destination and the determined fallback costs. The cost map (including any additional characteristics such as points in time and other characteristics of the autonomous vehicle) may then be input into the planning system in order to plan a nominal trajectory which attempts to avoid higher cost potential states while still making progress towards the autonomous vehicle 100's destination according to a route provided by the routing system. When multiple alternative nominal trajectories are generated, the overall costs of all nominal trajectories may then be used to select a nominal trajectory. For example, when evaluating the overall costs of a trajectory as described above, if that trajectory includes any potential states of the cost map, the fallback costs of those potential states may be added to the other costs of a trajectory to determine the overall cost of the trajectory. In some instances, these fallback costs may be added based on how close to any of the potential states the trajectory comes. In this regard, the closer the trajectory comes to any particular potential state, the higher the percentage of the fallback cost of that potential state that may be added to the cost of the trajectory. The overall costs of different nominal trajectories may then be compared to select the lowest cost nominal trajectory. In this regard, the planning system may select a nominal trajectory which attempts to avoid higher fallback cost potential states from the cost map.

Alternatively, rather than utilizing costs as described above, the fallback costs for each potential state may be input as hard or soft constraints for trajectory planning. As an example, hard constraints may be those that cannot be violated, while soil constraints may be those that can be violated if no other solution is available. In this regard, when trajectory planning, the overall cost of a particular trajectory may be increased based on how close to any of the potential states of the set of potential states that the trajectory gets.

Figure 9:
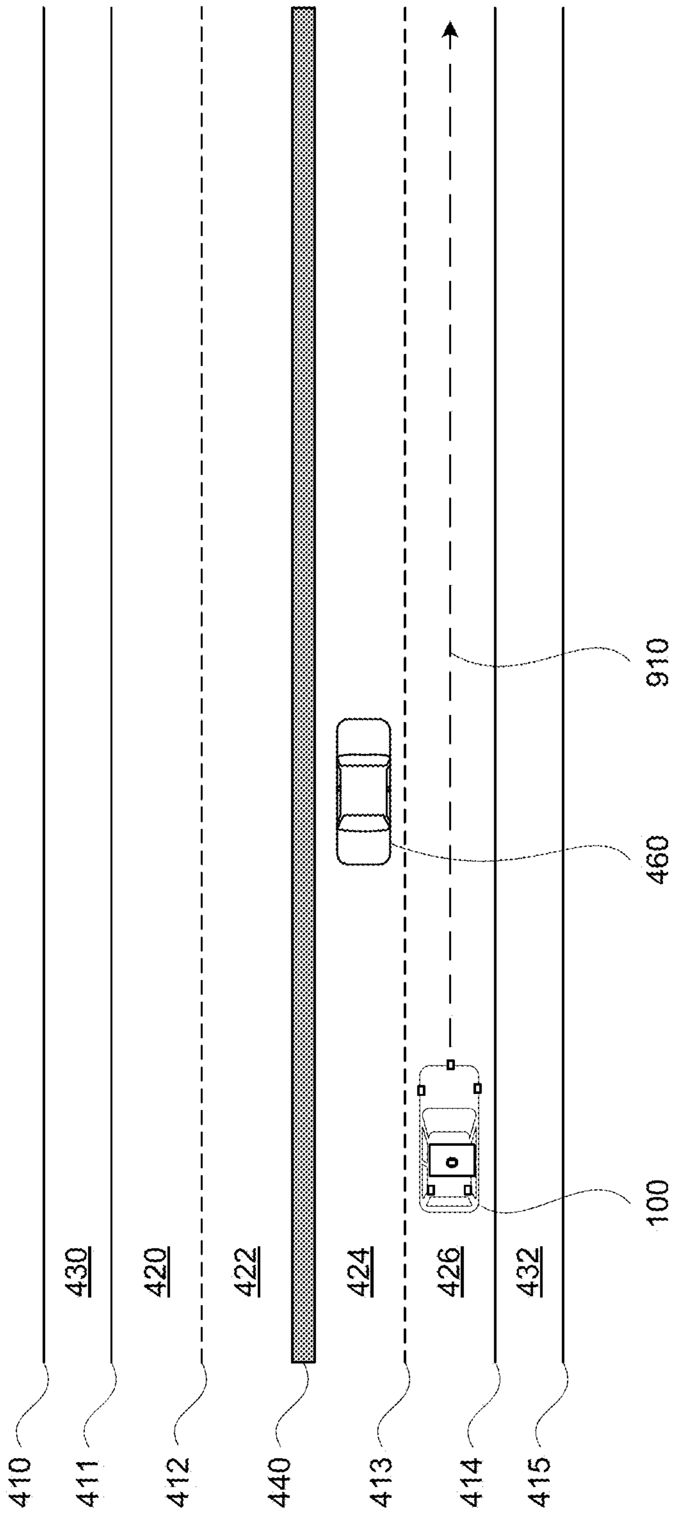
FIG. 9 is an example representation of a geographic area, vehicles, and a nominal trajectory in accordance with aspects of the disclosure.

In some instances, the fallback costs can be used in trajectory searches to avoid potential states along the nominal trajectory with a high fallback cost. For example, trajectories that would include potential states with infinitely high costs may simply be discarded immediately or avoided at the search stage. In this regard, highly undesirable potential states may have the highest fallback costs and thus the most influence on the nominal trajectory (e.g., a heavy penalty for braking prior to entering a railroad crossing). A nominal trajectory search can explore alternative potential states to avoid paying a large fallback cost for any particular potential state according to the cost map. Alternatively, rather than include all potential states as costs or constraints, to reduce the processing power and time needed to complete the planning, only those potential states that have fallback costs higher than a threshold value may be input as costs or constraints. FIG. 9 is a representation of a nominal trajectory 910 which may be generated and selected using the cost map as described above.

Figure 10:
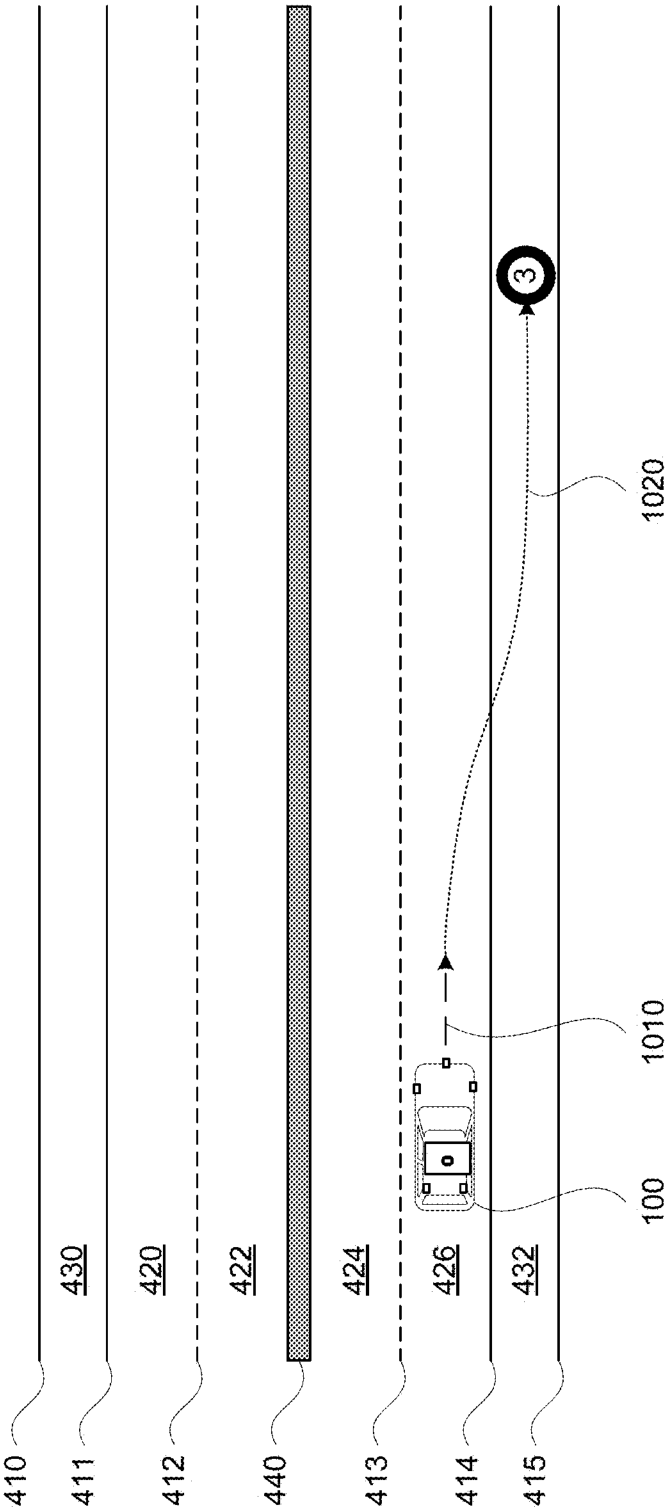
FIG. 10 is an example representation of a geographic area, vehicles, a portion of a nominal trajectory, and a fallback portion in accordance with aspects of the disclosure.

A portion of the nominal trajectory may then be used to plan a fallback trajectory to one of the set of potential stopping locations as described above. FIG. 10 includes a representation of a portion 1010 of the nominal trajectory 910. The fallback trajectory includes both the portion 1010 as well as a fallback portion 1020, which results in the autonomous vehicle 100 stopping at node 3. In this example, the location of node 3 may be the potential stopping location with the lowest fallback cost and/or the lowest overall cost as described above. However, in some instances, the cost map may be used to determine the fallback trajectory as described above with respect to the nominal trajectory. A final trajectory may then be generated by using a first portion of the selected nominal trajectory and a second portion of the fallback trajectory. In this regard, the portion 1010 and fallback portion 920 may together form the final trajectory or rather, the fallback trajectory which is used to control the autonomous vehicle 100.

Returning to FIG. 11, at block 1150, the autonomous vehicle is controlled according to at least a portion of the trajectory. The final trajectory may be published to other systems of the autonomous vehicle and used to control the autonomous vehicle. In this regard, at least a subportion of the portion of the selected nominal trajectory (e.g., something less than the portion of the selected nominal trajectory) may be used to control the autonomous vehicle until a new trajectory is generated and published to the various systems of the autonomous vehicle. In other words, some smaller portion of the portion 1010 may be used to control the autonomous vehicle 100 until a new final trajectory, determined as described above, is generated and published. If a new final trajectory is not received in time, the autonomous vehicle 100 may continue to follow the final trajectory, including the fallback portion 1020 in order to cause the autonomous vehicle 100 to stop at the location of node Q.

The results of this approach may improve the autonomous vehicle's performance in the event that the autonomous vehicle needs to stop and/or pull over. For instance, because the fallback costs of different potential states are used to generate each nominal trajectory, the nominal trajectories may be generated in order to position the autonomous vehicle as best as possible in the event that the autonomous vehicle needs to stop because of a failure in the planning system (e.g., because a new trajectory is not generated in time). As an example, the autonomous vehicle may be more likely to generate nominal trajectories which cause the autonomous vehicle to slow down around turns or curves in order to enable the autonomous vehicle to still stop or pullover within a visible range of the autonomous vehicle's perception system or which cause the autonomous vehicle to drive through locations where stopping is not safe or advisable (e.g., intersections or railroad crossings).

In some instances, the features described herein may extend the amount of time the autonomous vehicle has to stop or pull over providing for additional options for stopping the autonomous vehicle. For example, in the case of a situation where the autonomous vehicle is in heavy traffic with a small (e.g., a 5 to 10-foot distance) between the autonomous vehicle and another vehicle in front of the autonomous vehicle, without the features, the fallback trajectory may require that the autonomous vehicle stop within that short distance. For example, a fallback trajectory generated as described herein might be able to maneuver the autonomous vehicle to the left or right side of a lead vehicle and stop there by avoiding potential states that require the autonomous vehicle to stop behind the lead vehicle and encouraging a nominal trajectory that provides enough room to steer around the lead vehicle. At the same time, a fallback system that only changes the speed profile of the nominal trajectory would only be able to stop before the lead vehicle.

In addition, when the nominal trajectory is planned while considering the costs of potential fallback outcomes, the autonomous vehicle may be able to travel beyond its current location and therefore make additional progress towards the destination or stop in a more desirable location. For instance, if a nominal trajectory had an autonomous vehicle making a turn at a corner and the autonomous vehicle is not able to perceive the area around the corner, because the fallback trajectory is considered when planning the nominal trajectory, the nominal trajectory may allow the autonomous vehicle to take a corner in such a way that allows the autonomous vehicle to keep the optimality to go straight and avoid the turn.

The features described herein may enable an autonomous vehicle to plan a nominal trajectory which is influenced by the costs of potential fallbacks. This, in turn, may enable the autonomous vehicle to improve its overall performance in the event of failure which requires the autonomous vehicle to stop and/or pull over.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method for controlling an autonomous vehicle, the method comprising:

identifying, by one or more processors, a set of potential stopping locations based on a current location of the autonomous vehicle;

identifying, by the one or more processors, a set of potential states for the autonomous vehicle;

determining, by the one or more processors, at least one gradient, wherein each gradient is associated with a corresponding potential stopping location of the set of potential stopping locations, and wherein each gradient represents fallback costs associated with reaching the corresponding potential stopping location of the set of potential stopping locations from each potential state of the set of potential states;

planning, by the one or more processors, a nominal trajectory and at least one fallback trajectory for the autonomous vehicle based on a route to a destination and the determined fallback costs, wherein the nominal trajectory controls the autonomous vehicle towards the destination, and wherein the at least one fallback trajectory leads to a stopping location of the set of potential stopping locations;

generating, by the one or more processors, a final trajectory including a portion of the nominal trajectory and a portion of the at least one fallback trajectory;

controlling, by the one or more processors, the autonomous vehicle according to at least a portion of the final trajectory; and in response to not receiving an updated final trajectory prior to reaching the portion of the at least one fallback trajectory controlling, by the one or more processors, the autonomous vehicle according the at least one fallback trajectory to stop at the stopping location.

2. The method of claim 1, wherein the set of potential states is identified based on the current location of the autonomous vehicle and a planning horizon for the nominal trajectory, wherein the planning horizon is measured in time.

3. The method of claim 1, wherein the determined fallback costs are determined using a backward induction approach, wherein the backward induction approach provides a point in time for each potential state of the set of potential states.

4. The method of claim 1, wherein each potential state of the set of potential states includes a location and a combination of characteristics.

5. The method of claim 4, wherein the location of each potential state is a location that the autonomous vehicle can potentially reach within a planning horizon for the nominal trajectory based on the combination of characteristics.

6. The method of claim 1, wherein a first potential state of the set of potential states includes a first location and a first future point in time, and a second potential state of the set of potential states includes the first location and a second future point in time different from the first future point in time.

7. The method of claim 1, wherein a first potential state of the set of potential states includes a first location and a first plurality of characteristics, and a second potential state of the set of potential states includes the first location and a second plurality of characteristics different from the first plurality of characteristics.

8. The method of claim 7, wherein the first plurality of characteristics includes at least one of: a speed of the autonomous vehicle different from a speed of the autonomous vehicle of the second plurality of characteristics; an acceleration or deceleration of the autonomous vehicle different from an acceleration or deceleration of the autonomous vehicle of the second plurality of characteristics; a rate of change of acceleration or deceleration of the autonomous vehicle different from a rate of change of acceleration or deceleration of the autonomous vehicle for the second plurality of characteristics; a heading of the autonomous vehicle different from a heading of the autonomous vehicle of the second plurality of characteristics; or an orientation of the autonomous vehicle different from an orientation of the autonomous vehicle of the second plurality of characteristics.

9. The method of claim 1, wherein each potential stopping location of the set of potential stopping locations is within a predetermined distance from the autonomous vehicle in time, space, or both time and space.

10. The method of claim 1, wherein the nominal trajectory and the at least one fallback trajectory share a same initial trajectory segment.

11. The method of claim 1, wherein determining the determined fallback costs results in a cost map, and the method further comprises:

planning, based on at least the cost map, a fallback trajectory from each potential stopping location to each potential state of the set of potential states.

12. The method of claim 1, further comprising:

in response to receiving the updated final trajectory prior to reaching the portion of the at least one fallback trajectory controlling, by the one or more processors, the autonomous vehicle according to at least a portion of the updated final trajectory.

13. The method of claim 1, wherein the at least one gradient is used to plan the nominal trajectory and avoid certain potential states of the set of potential states.

14. The method of claim 13, wherein avoiding the certain potential states reduces an overall cost of the nominal trajectory.

15. The method of claim 13, wherein the nominal trajectory is used to plan the fallback trajectory by selecting the stopping location for the nominal trajectory having a lowest determined fallback cost.

16. The method of claim 1, wherein at least one potential stopping location of the set of potential stopping locations is located in an occluded area, and wherein the at least one potential stopping location of the set of potential stopping locations located in the occluded area has a highest fallback cost.

17. A system for controlling an autonomous vehicle, the system comprising one or more processors configured to:

identify a set of potential stopping locations based on a current location of the autonomous vehicle;

identify a set of potential states for the autonomous vehicle;

determine at least one gradient, wherein each gradient is associated with a corresponding potential stopping location of the set of potential stopping locations, and wherein each gradient represents fallback costs associated with reaching the corresponding potential stopping location of the set of potential stopping locations from each potential state of the set of potential states; wherein the fallback costs are determined using a backward induction approach;

plan a nominal trajectory and at least one fallback trajectory for the autonomous vehicle based on a route to a destination and the determined fallback costs, wherein the nominal trajectory controls the autonomous vehicle towards the destination, and wherein the at least one fallback trajectory leads to a stopping location of the set of potential stopping locations;

generate a final trajectory including a portion of the nominal trajectory and a portion of the at least one fallback trajectory;

control the autonomous vehicle according to at least a portion of the final trajectory; and in response to not receiving an updated final trajectory prior to reaching the portion of the at least one fallback trajectory controlling, by the one or more processors, the autonomous vehicle according the at least one fallback trajectory to stop at the stopping location.

18. The system of claim 17, wherein the set of potential states is identified based on the current location of the autonomous vehicle and a planning horizon for the nominal trajectory.

19. The system of claim 17, wherein the backward induction approach provides a point in time for each potential state of the set of potential states.

20. The system of claim 17, wherein the stopping location of the at least one fallback trajectory has a lowest fallback cost among the determined fallback costs.

21. The system of claim 17, wherein each potential state of the set of potential states includes a location and a set of characteristics, wherein the set of characteristics includes at least one of: a speed of the autonomous vehicle; an acceleration or deceleration of the autonomous vehicle; a rate of change of acceleration or deceleration of the autonomous vehicle; a heading of the autonomous vehicle; or an orientation of the autonomous vehicle.

22. A non-transitory computer-readable medium storing instructions, which when executed by one or more processors of an autonomous vehicle, cause the autonomous vehicle to:

identify a set of potential stopping locations based on a current location of the autonomous vehicle;

identify a set of potential states for the autonomous vehicle;

determine at least one gradient, wherein each gradient is associated with a corresponding potential stopping location of the set of potential stopping locations, and wherein each gradient represents fallback costs associated with reaching the corresponding potential stopping location of the set of potential stopping locations from each potential state of the set of potential states;

plan a nominal trajectory and at least one fallback trajectory for the autonomous vehicle based on a route to a destination and the determined fallback costs, wherein the at least one fallback trajectory leads to a stopping location of the set of potential stopping locations;

generate a final trajectory including a portion of the nominal trajectory and a portion of the at least one fallback trajectory;

control the autonomous vehicle according to at least a portion of the final trajectory; and in response to not receiving an updated final trajectory prior to reaching the portion of the at least one fallback trajectory control, by the one or more processors, the autonomous vehicle according the at least one fallback trajectory to stop at the stopping location.

* * * * *